July 11, 1961  R. A. EKSTROM, JR  2,992,377
RAPID MOTOR OPERATED VALVES
Filed June 20, 1958  3 Sheets-Sheet 3

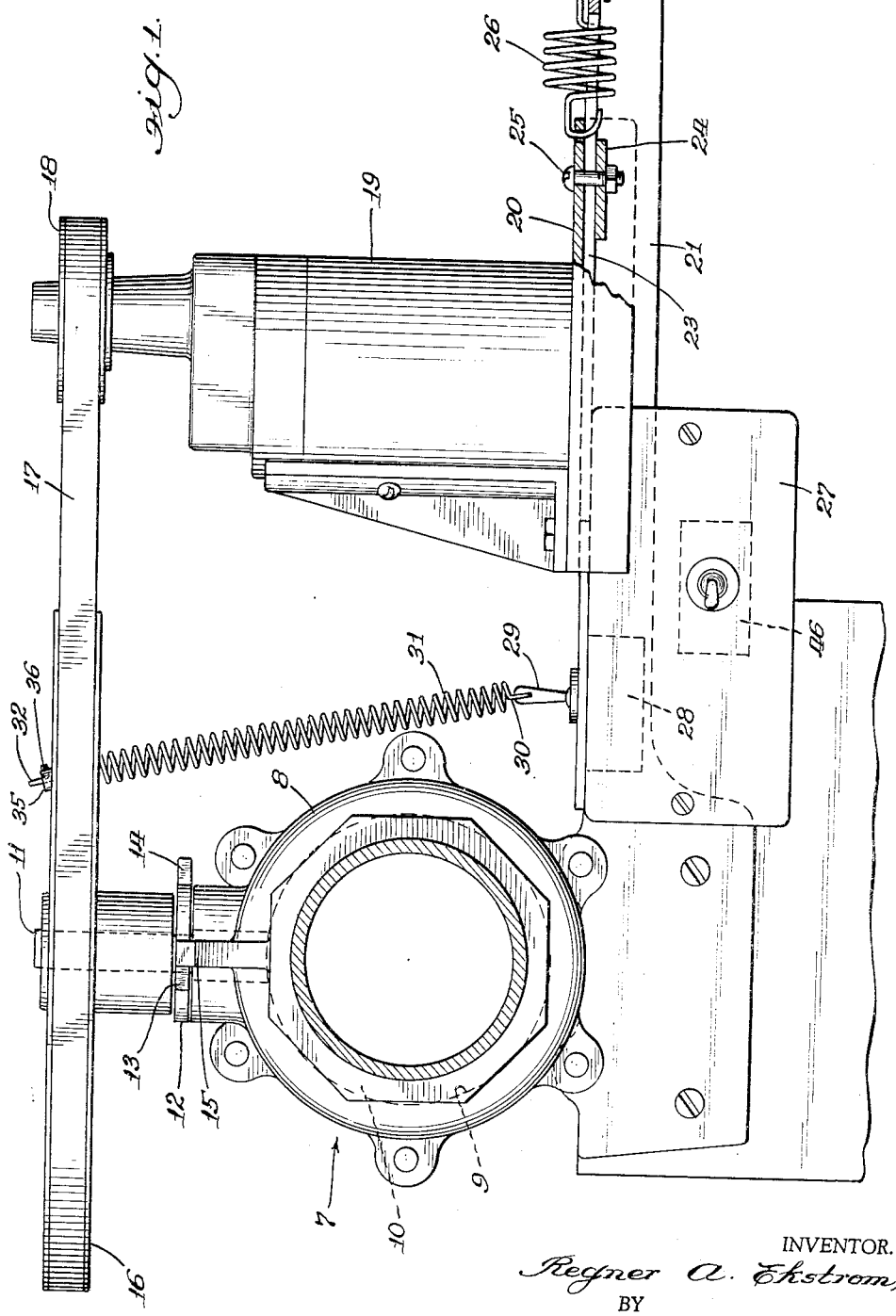

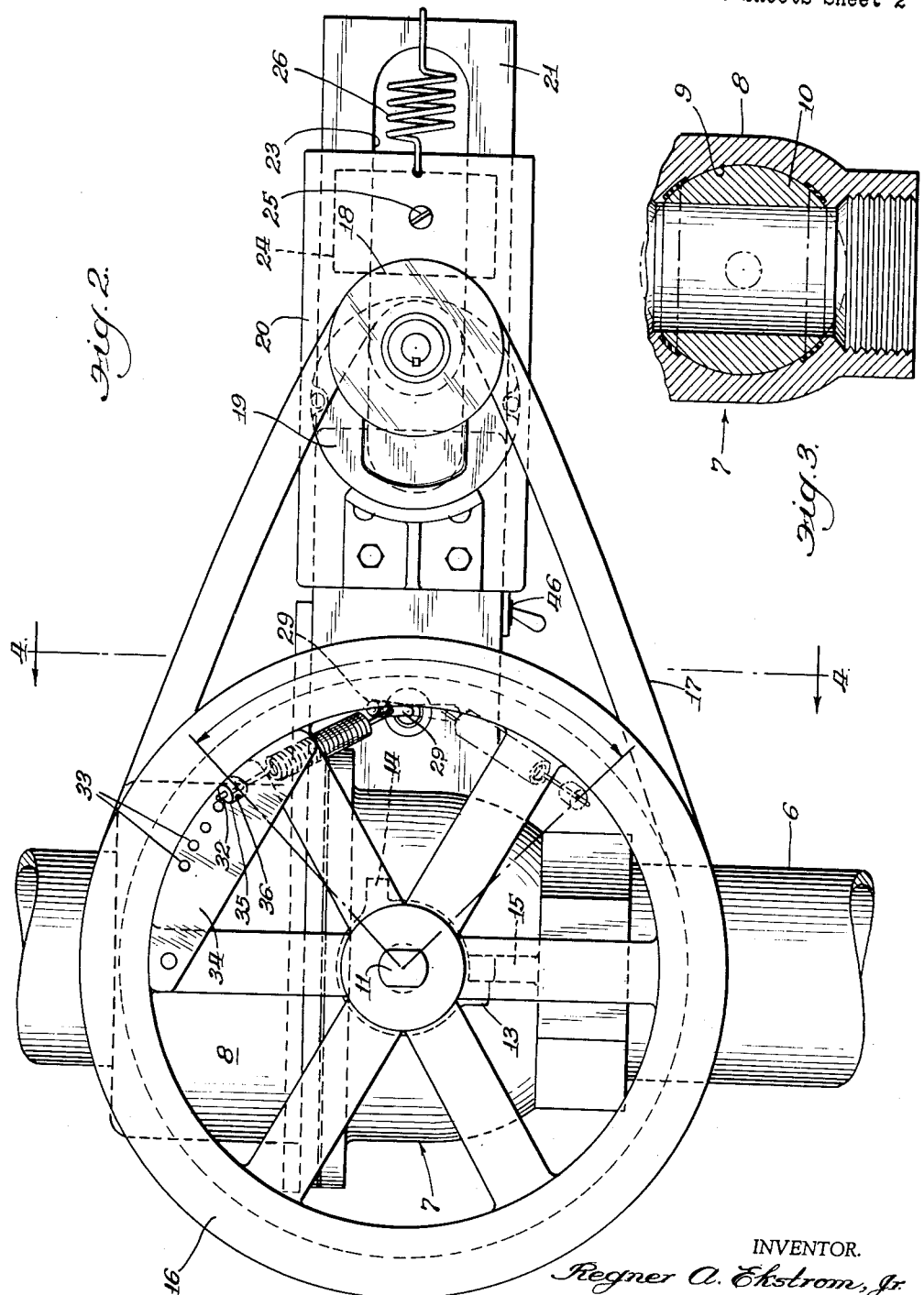

INVENTOR.
Regner A. Ekstrom, Jr.
BY
Glenn H. Noble
Atty.

United States Patent Office 2,992,377
Patented July 11, 1961

2,992,377
RAPID MOTOR OPERATED VALVES
Regner A. Ekstrom, Jr., 15555 Millard Ave., Markham, Ill.
Filed June 20, 1958, Ser. No. 743,387
3 Claims. (Cl. 318—267)

In many installations, it is necessary or desirable to have valves actuated rapidly or instantaneously and the present device is adapted for such operation. It is particularly applicable to globe valves or valves of the ball type which may be opened or closed through substantially 90° movement of the valve.

The principal objects of the present invention are to provide simple and efficient electrically operated means for quickly opening or closing valves of this type; to provide motor driven means for opening and closing the valve and also means whereby the valve may be readily opened or closed by hand.

Other advantages and objects will appear more fully from the following specification taken in connection with the accompanying drawings in which, FIG. 1 is a side elevation of the invention or view taken at right angles from the supply pipe.

FIG. 2 is a plan view of the same.

FIG. 3 is a sectional detail of the valve.

Figure 4:
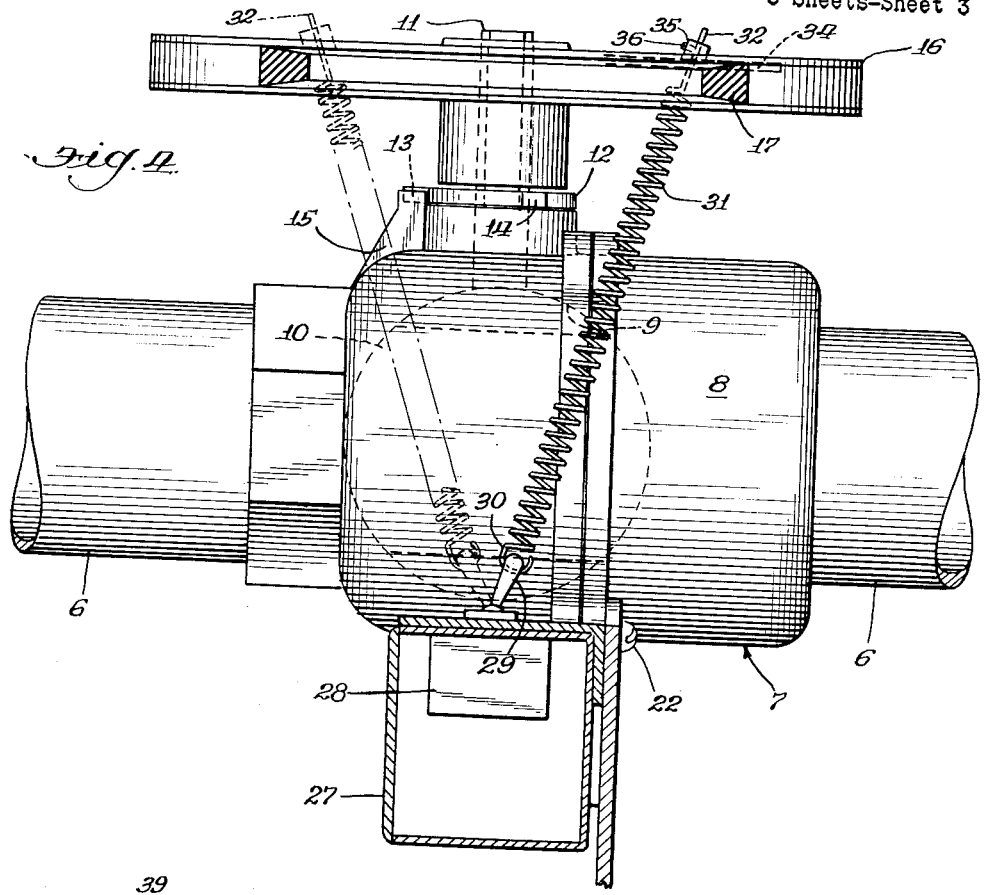
FIG. 4 is a sectional view taken on the line 4—4 of FIG. 1.

As shown in these drawings, a supply pipe 6 is provided with a ball valve 7 of any ordinary or preferred construction, these valves being at present in common use. The valve has a housing 8 with a cavity 9 for the valve ball 10 which has the usual passageway therethrough which may be brought into alignment with the pipe to open the same or may be closed by turning it 90° and is provided with a stem or projection 11 for turning the same. The stem is provided with a disc 12 having stop lugs 13 and 14 which engage with a stop 15 on the housing 8 which are arranged as shown in FIG. 2 to permit the ball to be turned 90°. The stem 11 is provided with a pulley 16 preferably of the V-type which is engaged by a belt 17 which is driven by a pulley 18 on the shaft of a reversible electric motor 19.

The motor 19 which is of any suitable type such as found in the market is attached to a slide or carriage 20 which is slidably mounted on the arm or guideway 21 which is substantially a frame member and is secured to the housing 8 by bolts 22 or may be formed integrally therewith. The arm 21 has a slot 23 and the carriage is held in slidable position by a plate 24 and bolt 25, the latter extending downwardly through the slot. A spring 26 has one end engaging with the end of the arm and the other end engaging with the slide as shown in FIG. 1 and provides tension to keep the belt sufficiently tight for operation while permitting a limited movement of the motor.

The arm 21 carries the switch box 27 which has two double pole double throw switches therein. One of these switches 28 has an operating arm 29 extending upwardly from the box 27 as shown in FIG. 4. The arm 29 is connected at one end 30 of a spring 31. The opposite end 32 projects up through holes 33 in the segmental plate 34 secured to the pulley 16 as shown in FIG. 1. The end of the spring is engaged by a button 35 and is held therein by a set screw 36 whereby the spring may be adjusted or moved from one hole to another to vary its action in operating the switch.

Figure 5:
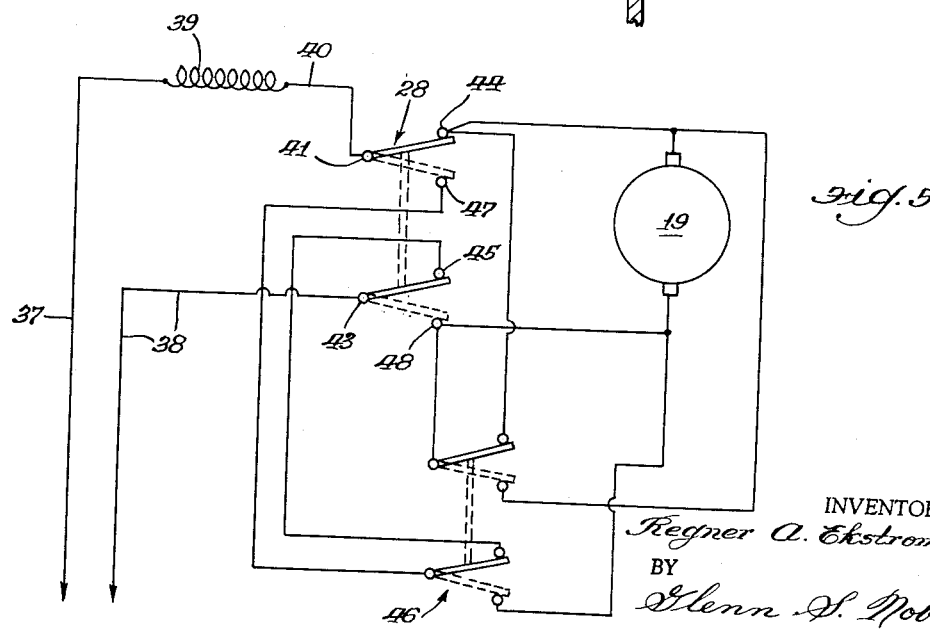
FIG. 5 is a wiring diagram.

As shown in FIG. 5, the electric current which may be either A.C. or D.C. is supplied through wires 37 and 38. The wire 37 is connected with a field winding 39 which is connected by wire 40 with one terminal 41 of the switch 28 which is operated by the motor and has the projecting arm 29.

The wire 38 is connected with another terminal 43 of the switch as shown. The other terminals 44 and 45 of the switches are connected with the motor as shown.

The second switch 46 in the switch box is connected in the circuit as shown and may be positioned at any desired point as at a distance from the operating parts and can be operated manually or can be automatically operated by a pressure or temperature controller.

Switch 28 is cross connected by the switch terminals 47, 48 and 44, 45 to provide for reversal of the motor 19 which may be done in several conventional ways.

Having thus described my invention, what I claim is:

1. A controller for a rotary valve comprising a housing, a stem rotatably mounted in said housing, a supporting frame adjacent said housing, a guideway on said frame, a slide member slidably mounted on said guideway, a reversible rotary electric motor mounted on said slide member, a first spring disposed intermediate said guideway and said slide and connecting said guideway and said slide for biasing said motor away from said stem, a first pulley mounted on the shaft of said motor, a second pulley mounted on said stem, a belt connecting said first and second pulleys in driving engagement, and means for controlling operation of said motor, said means including a first double pole double throw switch mounted below said second pulley, a second spring, means securing one end of said second spring to said second pulley, said second spring having its other end secured to said first double pole double throw switch, a second double pole double throw switch, and circuit means interconnecting said first and second switches and said reversible motor whereby actuation of the switches will control the motor.

2. A device as set forth in claim 1 wherein said means securing said one end of the said second spring to said second pulley includes a plate member mounted on said second pulley, said plate member having a plurality of spaced apertures therein and detachably receiving said one end of said second spring in a selected one of said apertures, and means for retaining said one end of said second spring in said selected one of said apertures.

3. A device as set forth in claim 1 having a stop member mounted on said housing, and stop means mounted on said stem for cooperation with said stop member to limit movement of said stem to an arc of 90°.

References Cited in the file of this patent
UNITED STATES PATENTS

| | | |
|---|---|---|
| 1,279,900 | Pearsall | Sept. 24, 1918 |
| 1,625,010 | Windt | Apr. 19, 1927 |
| 2,623,618 | Howard | Dec. 30, 1952 |
| 2,851,648 | Reger | Sept. 9, 1958 |